United States Patent [19]

Bates

[11] Patent Number: 4,690,790

[45] Date of Patent: Sep. 1, 1987

[54] SILICON NITRIDE/SILICON CARBIDE COMPOSITION AND ARTICLES THEREOF

[75] Inventor: Carl H. Bates, South Amboy, N.J.

[73] Assignee: Stemcor Corporation, Cleveland, Ohio

[21] Appl. No.: 758,184

[22] Filed: Jul. 23, 1985

[51] Int. Cl.$^4$ .................. C04B 35/56; C04B 35/58
[52] U.S. Cl. ........................ 264/63; 501/92; 264/65
[58] Field of Search ............ 501/92; 264/65, 63

[56] References Cited

U.S. PATENT DOCUMENTS

| | | | |
|---|---|---|---|
| 2,750,268 | 6/1956 | Erasmus | 501/92 |
| 2,752,258 | 6/1956 | Swentzel | 501/92 |
| 3,222,438 | 12/1965 | Parr et al. | 501/92 |
| 4,164,528 | 8/1979 | Yajima et al. | 501/92 |
| 4,560,668 | 12/1985 | Hunold et al. | 501/92 |

Primary Examiner—Mark L. Bell
Attorney, Agent, or Firm—D. M. Ronyak

[57] ABSTRACT

Corrosion and thermal shock resistant high silicon nitride content silicon nitride-bonded silicon carbide article, e.g., nozzle for transfer of molten metal, is prepared by combining finely divided silicon metal, silicon carbide grain with processing aids, forming the mixture into an article, and firing the article in nitrogen. Even higher silicon nitride content is obtained by crushing the article to obtain a precursor grog material, combining this grog with more finely divided silicon metal and processing aids, forming the mixture into an article and firing in nitrogen. Silicon nitride content of up to about 70 weight percent may be obtained with single mixing and firing; up to about 98 weight percent with use of nitrided precursor grog, remixing and firing. With reiteration, a silicon nitride content of essentially 100 weight percent can be approached.

8 Claims, 1 Drawing Figure

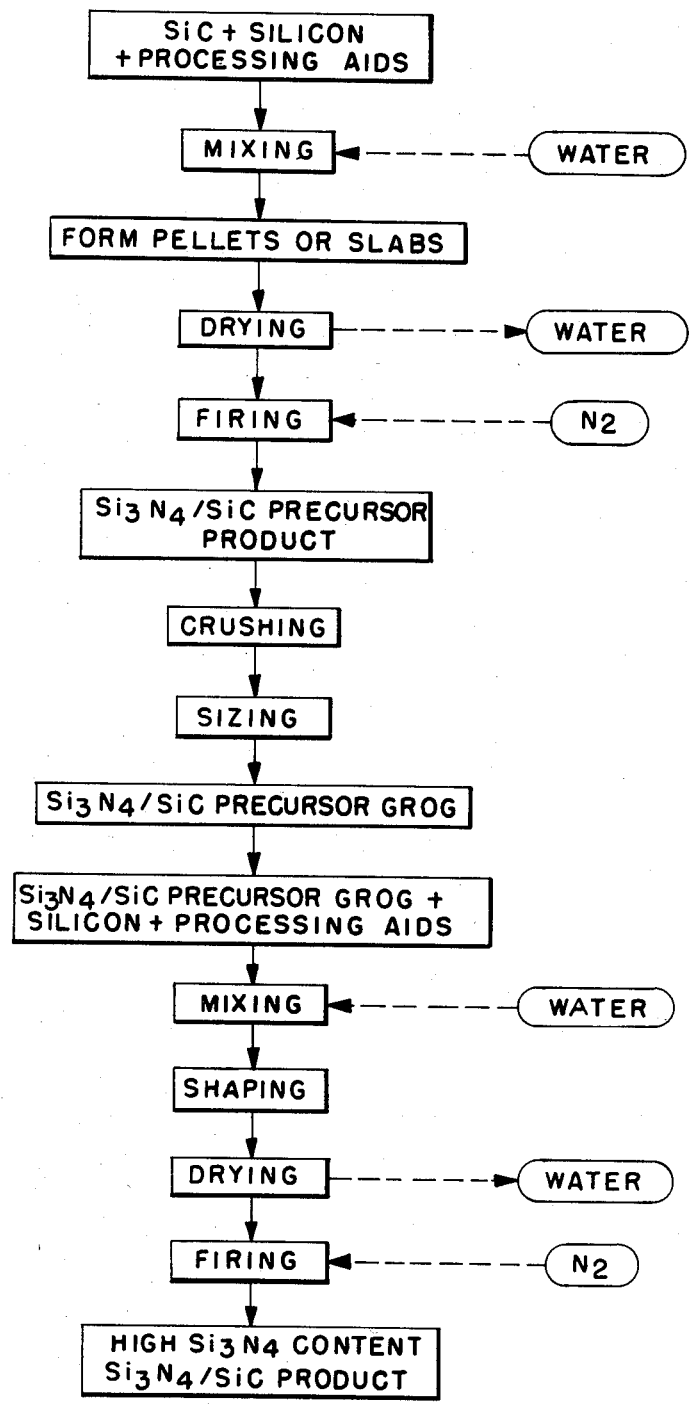

SILICON NITRIDE/SILICON CARBIDE COMPOSITION AND ARTICLES THEREOF

This invention relates to silicon nitride-bonded silicon carbide material and articles composed thereof. Particularly this invention relates to high silicon nitride content silicon nitride/silicon carbide compositions and articles therefrom, and methods of making said materials and articles. More particularly, the present invention relates to a shroud of silicon nitride-bonded silicon carbide material and method of making such shroud, said shroud being of high corrosion resistance when in contact with mold fluxes and molten metal commonly encountered in the continuous casting of steel.

DISCUSSION OF PRIOR ART

Much of the world's iron and steel production is now achieved by the continuous casting method. In this process, there is a need for refractory materials which are resistant to contact with mold fluxes and molten ferrous-based metal. These processes are gaining widespread acceptance with respect to carbon grade steel, electrical grade steel, and even stainless steels. Materials which are resistant to the fluxes and molten metal are needed for tundish nozzles, tundish stoppers, submerged nozzles, and ladle shrouds. The steel industry today commonly employs continuous casting shrouds or submerged nozzles of alumina/graphite, alumina/graphite/zirconia, or fused silica. Most prevalent are nozzles of alumina/graphite composite, which material has good thermal shock resistance and good resistance to the fluxing materials. Also commonly used are submerged nozzles of fused silica composition, which have very good thermal shock resistance. However, these fused silica nozzles are readily attacked by the fluxes or slags.

SUMMARY OF THE INVENTION

According to an aspect of this invention, there is provided a high silicon-nitride content, silicon nitride/silicon carbide composition which provides high resistance to thermal shock and molten ferrous mold powder corrosion/erosion.

According to another aspect of the present invention, there is provided a method of producing high silicon nitride content silicon nitride/silicon carbide compositions and articles thereof by forming a mixture of silicon carbide grain, silicon metal with water and processing aids, forming pellets or other articles thereof, drying these pellets or said articles, and firing these pellets or articles in a nitrogenous, non-oxidative atmosphere to form high silicon nitride content silicon nitride/silicon carbide refractory pellets or articles.

According to another aspect of the present invention, there is provided a method of producing high silicon nitride content, silicon nitride/silicon carbide compositions and articles thereof by forming a mixture of silicon carbide grain and silicon metal with water and processing aids, forming pellets or slabs thereof, drying the pellets or slabs, firing the pellets or slabs in a nitrogenous non-oxidative atmosphere, crushing and sizing the pellets or slabs to form a grog, re-compounding the crushed silicon nitride/silicon carbide grog with silicon metal, water and processing aids into a green composition, shaping the green composition, drying and firing the dried shaped green composition in a nitrogenous non-oxidative atmosphere to form a high silicon nitride content silicon nitride/silicon carbide article.

Materials and articles according to the present invention provide greater refractoriness, thermal shock resistance and corrosion/erosion resistance than presently available materials/articles for use in continuous casting equipment for the steel industry, and thus increase the operating time between necessary replacement of these components, thereby greatly improving overall capital equipment utilization involved in the manufacture of iron and steel by continuous casting processes.

The use of silicon nitride as a bonding phase for silicon carbide aggregate is taught in U.S. Pat. No. 2,752,258 the disclosure of which is herein incorporated by reference. In this U.S. Patent there is described a bonded silicon carbide article having granular silicon carbide bonded by silicon nitride in which substantially all of the silicon of the bond is combined with nitrogen as silicon nitride having the chemical formula $Si_3N_4$. According to this reference, the silicon carbide particles are held together by a bonding phase of silicon nitride that is obtained by intimately mixing silicon powder of at least 200 mesh (U.S. Standard Sieve) and finer with moisture to form a moldable mixture, then molding the desired mass or shape from the mixture, drying the thus formed material and firing it in a non-oxidizing, nitrogenous atmosphere at a temperature and period of time sufficient to convert substantially all the silicon metal to silicon nitride. Dry lignone and bentonite gel (one part dry bentonite to four parts water) are employed as processing aids and temporary binders.

It has been found that when a mixture of 100 percent silicon metal plus temporary binders (97 percent-by-weight silicon) is cast and fired in nitrogen, the resulting product is extremely porous and friable.

In the past, 100 percent silicon has been isostatically pressed and presintered in argon before nitriding. Isostatic pressing typically produces a body with lower porosity than casting. Resulting poor nitrogen penetration only gives a nitrided skin about 9 mm thick (cf. paper on "Reaction Bonded $Si_3N_4$-SiC," Huang Hsioe Lsien et al, Shanghai Institute of Ceramics 1978, Japan Inter Symposium on Factors in Densification & Sintering Of Oxide, Non-oxide Ceramics).

In a continuous casting shroud application, it is imperative that no residual silicon metal be present in the inside of the nitrided body as this will severely negatively affect the thermal shock resistance of the shroud in operation due to thermal expansion of the silicon metal being greater than that of silicon nitride.

U.S Pat. No. 2,618,565 describes the manufacture of silicon nitride products and products bonded with silicon nitride in which the silicon nitride is formed by conversion of silicon powder to silicon nitride during manufacture of the body, and wherein a catalyst is used for promoting the conversion of the silicon to silicon nitride. From ½ to 5 percent of a fluoride is employed to catalyze the conversion of silicon to silicon nitride.

U.S. Pat. No. 2,636,828 discloses compositions and articles composed essentially of oxidic material bonded by silicon nitride formed by conversion of silicon to silicon nitride during manufacture of the material or article in which the rate of conversion of silicon to silicon nitride is increased by adding a small percentage of iron powder.

U.S. Pat. No. 3,206,318 describes the manufacture of refractory articles having silicon nitride sinters as their principle component. The raw batch used in the manufacture of such articles contains a nitriding catalyst, e.g. metallic vanadium, $V_2O_5$ and $NH_4VO_3$. The addition of a fine powder of silicon carbide is taught to increase the resistance to oxidation of the resulting refractory article.

U.S. Pat. No. 3,222,438 describes the manufacture of self-bonded silicon nitride articles having a dispersion therein of fine silicon carbide from a compacted powdered mixture containing 90–95 percent by weight silicon and 10–5 percent by weight finely silicon carbide of a particle size of about 400 B.S. mesh.

U.S. Pat. No. 3,926,857 describes an electrically conducting material produced by nitriding a mixture of silicon and a component capable of being converted to an electrically conducting phase under the conditions of nitriding, e.g. colloidal graphite which is converted to silicon carbide during the nitriding step. The silicon carbide content of the resultant article is not greater than 37 percent by weight.

U.S. Pat. No. 4,038,092 describes a reaction-sintered silicon nitride body whose strength is substantially increased by impregnating its surface with finely divided alumina and thereafter firing the body in a nitrogen atmosphere having an appreciable partial pressure of SiO.

U.S. Pat. No. 4,127,630 describes a form of reaction-bonded silicon nitride and its process of manufacture, the product being characterized by isotropic structure, extremely small pore and grain size, high strength and a high ratio of alpha silicon nitride to beta silicon nitride. The silicon employed as a starting material has a maximum particle size of 10 microns, and an average particle size of the order of 2 microns or less. This fine silicon powder is pressed and thereafter sintered in an inert gas atmosphere such as argon and thereafter the bonded product is machined and thereafter nitrided in accordance with standard procedures.

U.S. Pat. No. 4,332,755 describes a method of pressureless co-sintered silicon carbide/aluminum nitride articles in which a mixture is formed of silicon carbide, aluminum nitride and carbon or carbon source material. The mixture is shaped into an initial green body by cold pressing, the initial green body is crushed to about 40 mesh and reformed into a second green body, and the second green body is pressureless sintered in an inert atmosphere at a temperature between about 1900° C. and about 2250° C. to a density of at least 75 percent of the theoretical density of silicon carbide.

The present invention will be better understood when reference is made to the single FIGURE of drawing which is a schematic representation of a process according to the present invention.

DETAILED DESCRIPTION OF PREFERRED EMBODIMENTS

All percents, fractions and ratios given in this specification and its claims are on a weight basis unless otherwise specifically indicated.

All particle sizes are expressed in terms of U.S. Standard Sieve unless otherwise specifically indicated.

Compositions according to the invention and articles to be made therefrom are produced from the following ingredients: silicon carbide grain, granular silicon metal and processing aids such as calcium aluminate or other hydraulically setting cement, calcium stearate, ball clay, dextrin, $Al(OCl)_x$ bond system, fumed silica powder, deflocculant and water.

The silicon carbide grain used in the examples provided herein was obtained from Sohio Electro Minerals Company, Niagara Falls, New York. This silicon carbide grain has the following chemical specification:
SiC—97 percent minimum
Fe—0.25 percent maximum
Al—0.25 percent maximum
Free C—0.75 percent maximum
Surface Si—0.90 percent maximum
$SiO_2$—1.90 percent maximum This silicon carbide grain is crushed and graded into various size fractions. In the manufacture of refractory articles deemed to be highly suitable for continuous casting equipment, the particle size of silicon carbide typically ranges from particles as large as 6 mesh to those finer than 70 mesh. Preferred particle size distribution is
47 percent 30–70 mesh
53 percent 70 and finer The $SiO_2$ is believed to exist predominantly in the form of a film on the outer surface of the SiC grains; thus it is expected that smaller particles will have a higher $SiO_2$ content. The SiC powder is believed to contain a very thin oxide film. The amount of oxygen contained in this film is believed to be 0.3 to 1.0 percent by weight of the silicon carbide.

The silicon metal grain utilized in the examples provided herein was obtained from Elkem Metals of Marietta, Ohio. This silicon metal grain has the following specification:
Si—98 percent minimum
Fe—1 percent maximum
Ca—0.07 percent maximum
Cr—0.10 percent maximum This silicon metal has a particle size of between 200 and 600 mesh U.S. Standard Sieve. Use of silicon metal having a particle size less than 600 mesh results in low density and poor weight gains. Use of silicon metal having a particle size greater than 200 mesh results in incomplete nitriding of each grain, possibly because each grain forms a shroud of $Si_3N_4$ which limits further nitridation. While no oxygen specification is provided by the manufacturer, it is believed that the surface of the silicon metal grain oxidizes upon exposure to the atmosphere at ambient temperatures. The measured oxygen content of a sample of minus 200 mesh silicon metal grain was 0.64 percent.

Preferably, the mix contains a hydraulic setting agent such as calcium aluminate cement. Suitable calcium aluminate cement may be obtained from The Aluminum Company of America, Pittsburgh, Pennsylvania, under the name CA-25, and has the following typical analysis:

|  | Standard Grade |
| --- | --- |
| $Al_2O_3$ | 79.0 |
| $SiO_2$ | 0.15 |
| $Fe_2O_3$ | 0.3 |
| $Na_2O$ | 0.5 |
| CaO | 18.0 |
| MgO | 0.4 |
| Ignition loss 1100° | 1.5 |

Portland cement may also be used.

Calcium stearate may be employed as a processing aid to improve fluidity of a castable mix. Typically, about ½ milliliter of calcium stearate is added per pound of mix of silicon carbide grain, silicon carbide/silicon nitride grog and silicon metal. Suitable calcium stearate is produced by Eschem Inc. of Chicago, Illinois and is available from Swift Adhesives & Coatings.

Ball clay is employed as a processing aid. Ball clay aids in obtaining a castable mix. Ball clay serves as a primary fluidizer and is preferably used in combination with Darvan$^{tm}$ deflocculant.

A suitable ball clay, distributed by the Kentucky-Tennessee Clay Company, Mayfield, Kentucky, as #1 S.G.P. ball clay has the following typical analysis:

$SiO_2$—55.2 percent
$Al_2O_3$—29.5 percent
$Fe_2O_3$—0.8 percent
$TiO_2$—1.7 percent
$CaO$—0.2 percent
$MgO$—0.3 percent
$K_2O$—1.4 percent
$Na_2O$—0.3 percent
Loss on ignition—10.7 percent This clay is supplied in dried form and has a particle size of less than 99 percent finer than 20 microns.

Dextrin is vegetable starch gum formed by hydrolysis of starches. It is employed as a processing aid as a temporary binder in a castable mix. The variety employed in the present invention is available under the trade name "Stadex" from A. E. Staley Manufacturing Company, Decatur, Illinois.

A high purity bond system containing $Al(OCl)_x$ is available from Keith Refractories of England under the name HPB 5025. This material is employed in casting mixes according to the present invention as a processing aid to increase green strength of a cast part.

A suitable fumed silica powder is LS powder. LS powder is a very fine silica-containing powder available from Sohio Engineered Products Company, Fibers Division, Niagara Falls, NY. It is employed as a fluidizer of ceramic powder containing mixes. Its use permits obtaining a flowable mix at lower moisture levels than otherwise practical.

A deflocculant is employed to aid in separation of and maintenance in suspension of the fine particles of the mix. A highly suitable deflocculant is Darvan$^{tm}$ 7 polymer ion deflocculant available from W. R. Grace, Organic Chemicals Division. Its use permits obtaining a flowable mix at lower moisture levels than otherwise practical. It is particularly effective when used in combination with LS powder.

In order to obtain satisfactory conversion of the silicon to silicon nitride within a reasonable period of time when a commercial grade of silicon carbide of the type above described is used, the silicon should be of a particle size fine enough to pass through a screen of 200 mesh U.S. Standard sieve (70–90 microns particle size) or finer, down to 600 mesh U.S. Standard sieve. Preferably, the silicon is of a particle size in the neighborhood of 200 mesh. Incomplete nitridation of the interior of an article may occur if the silicon particle size is smaller than 600 mesh due to rapid reaction of the zone adjacent to the exterior of the article which apparently reduces permeability to nitrogen.

"Fine" and "finely divided", as these terms are used herein with respect to particle size, means a particle size of between about 200 mesh and 600 mesh U.S. Standard sieve. Although it is believed possible to obtain the desired results when using larger silicon metal particle sizes, performance of such may not be reliable because of incomplete conversion to silicon nitride ($Si_3N_4$).

With reference to FIG. 1 of the drawing, preparation of the material according to present invention is now described. A high silicon nitride/silicon carbide-containing precursor material is prepared by combining ingredients of silicon carbide grain, silicon metal, and dry processing aids and dry mixing these ingredients thoroughly to ensure a homogenous dry mix. Thereafter, water and wet processing aids are added and wet mixing is continued for several minutes to ensure homogeneity of the resulting wet mix. The amount of water is in part determined by the processing route chosen, which route may include forming a moist powder which can be subsequently pressed into pellets or forming a flowable mix which is intended to be cast into slabs or bricks. Reusable molds may be used for such casting. When pellets are to be formed by pressing, it is preferred to add sufficient water such that subsequent to mixing the wet mixture is in the form of a moist powder which can be formed into a ball by a human hand. The amount of water employed is about 7 percent by weight of the dry ingredients. When it is desired to form a castable material, the water content may be about 18 percent by weight of the dry ingredients to obtain a flowable mix that may be cast in disposable or reusable permanent molds and allowed to set overnight.

Manufacture of suitable pressed prenitrided grog pellets may be accomplished by dry mixing the following ingredients:

| | | |
|---|---|---|
| SiO | 34–70 mesh | 18 percent |
| SiO | <70 mesh | 20 percent |
| Si | 200 mesh | 60 percent |
| Dextrin | | 1 percent | with 7.6 percent water to which 1 ml Darvan$^{tm}$ 7 per pound of dry mix and 1-½ ml HPB 5025 per pound of dry ½ ml calcium stearate per pound of dry mix have been added. The wet is held overnight, during which the silicon metal reacts with process water, releasing $H_2$ gas. Thereafter the mixture is pressed into 1 inch diameter by 2 inches long pellets at 3.4 to 5 tons per square inch. The pellets are dried in air at room temperature for one day in a drying oven at 150° F. The dried pellets are nitrided at 1425° C. for 12 hours at atmospheric pressure.

Manufacture of suitable pressed bricks may be accomplished by mixing the following ingredients:

| | | |
|---|---|---|
| SiO | 34–70 mesh | 18 percent |
| SiO | <70 mesh | 20 percent |
| Si | 200 mesh | 60 percent |
| LS Powder | | 1 percent |
| Dextrin | | 1 percent | with 7.6 percent water to which 1 ml Darvan$^{tm}$ 7 per pound of dry mix and 1-½ ml HPB 5025 per pound of dry mix ½ ml calcium stearate per pound of dry mix have been added. The wet mix is thereafter pressed into 1 inch thick by 9 inches long by 4-½ inches wide bricks at 3.4 to 5 tons per square inch. These bricks are then dried at 60° C. in air for one day, followed by 120° C. in air for one day. The dried bricks are nitrided at 1425° C. at atmospheric pressure.

Firing of the green pellets or bricks is accomplished in a non-oxidative, nitrogenous atmosphere at substantially ambient atmospheric pressure. Higher or lower pressures may be employed but are not required. Firing may be accomplished in a retort made of refractory material which is introduced into a periodic gas-fired kiln. Nitrogen is introduced continuously into the retort as the pellets are heated to nitriding temperature. Reaction sintering of the pellets may be conducted in a tunnel kiln or induction-heated or plasma-heated furnace. A nitrogen atmosphere is initiated when the temperature reaches 420° C. and is maintained throughout the firing cycle and cool down to about 350° C. While substantial reactivity exists at above 1100° C., the temperature during nitridation firing should be in excess of 1300° C. but not over 1450° C. to achieve a commercially practical rate of reaction.

The nitriding reaction is exothermic and particularly active at 1180° C. and 1260° C. The pellets or bricks are loosely packed in the kiln and flowing nitrogen maintained to avoid runaway.

The temperature should not exceed about 1450° C. to avoid decomposition of the bond phase being formed, or coalescence of the silicon metal into larger agglomerates which act to inhibit nitridation. Preferably, nitriding is conducted at a temperature of about 1425° C. When pellets of 1 inch thick dimensions are employed and the preferred temperature of 1425° C. is employed, nitriding is generally accomplished in about six hours, although a longer period, e.g., twelve hours, is recommended to ensure complete reaction of the silicon metal with nitrogen within the pellets. After nitriding is complete, the article is allowed to cool under flowing nitrogen to a temperature of about 350° C. Typically, a cooling period of 24 hours is employed. The product may be considered complete at this time if silicon nitride levels of 50 to 70 percent are desired.

When higher silicon nitride level is desired in the final product, further processing is undertaken. The nitrided precursor material pellets are crushed. This may be accomplished by passing them through a jaw crusher, e.g., Morse Machinery Model No. JC-181, and then a roller crusher, Roskamp Model K, to provide a grog having a grain size predominantly ranging from 10 to 200 mesh with a median size of about 35 mesh.

The crushed nitrided precursor grog material may then be passed through a series of sieves to separate it into groups of known particle sizes.

The nitrided precursor grog material is then mixed with more silicon metal and processing aids. These dry materials are dry mixed. Thereafter, wet processing aids and an amount of water sufficient to provide the plastic or liquid characteristics necessary for forward processing are added and the materials mixed thoroughly to provide a homogenous mixture.

When it is desired to form shapes comparable to the continuous casting shrouds or tundish submerged nozzles or like complex shapes which include compound curves as a part of their configuration, the preferred forming process is casting. This second mix may be cast into molds of polystyrene foam, plaster or other material. While plaster molds may be employed, they are not preferred because of the tendency to draw fine particles of silicon metal and/or grog toward the mold wall and thus the surface of the cast article, which inhibits drying and nitridation of the cast article.

When a setting agent is employed, the preferred molds are made of expanded polystyrene beads coated with petroleum jelly.

The cast article may be removed in its unfired state from the mold after the cast material has set. When an expanded polystyrene foam mold is employed, it is not required that the cast article be removed from the mold. The article may be dried and the mold decomposed by gradually elevating the temperature of the polystyrene foam mold containing the cast article.

A typical continuous casting shroud for use in steel manufacture is generally of hollow cylindrical configuration. The inlet end of the shroud may be flared to accommodate its union with the upstream tundish. The exit end of the shroud contains an orifice and may be generally of hemispherical shape with the orifice centered therein. Typical dimensions of such a shroud are 30.5 inches (77.5 cm) overall length, 4 inches (10 cm) overall diameter, and 1 inch (2.5 cm) for the wall thickness. Drying of such a shroud when cast from a mixture containing 18 percent water generally requires about 14 days at 60° C. to reduce its moisture content below 1 percent.

The dried cast article is thereafter fired. Firing may be accomplished in the manner described with respect to firing of the precursor material. Following firing, the completed article is cooled to a temperature of about 350° C. while it is maintained under a non-oxidative nitrogenous atmosphere. Upon cooling, formation of the high silicon nitride content, silcon nitride bonded silicon carbide refractory article is complete.

Any organic materials which are employed as processing aids such as fluid modifiers or temporary binders are removed by subjecting the green pellets or bricks utilized in formation of the precursor material or the final bonded refractory article to an inert, non-oxidative gas at an elevated temperature below that at which reaction sintering (nitriding) occurs. Removal is effected as a natural consequence of the heat-up portion of the firing cycle. Organic binder removal may be accomplished at temperatures of between 350° C. and 650° C. It is preferred not to subject the green compacts of precursor material to an oxidizing step prior to reaction sintering to as to avoid oxidation of the silicon and silicon carbide powders.

Inorganic materials employed as processing aids are believed to be degraded upon heating during nitridation. Inorganic residues are believed to remain in the form of solid solutions in the silicon nitride matrix.

Suitable non-oxidative, nitrogenous atmospheres include single nitrogen gas and mixed nitrogen gas containing an inert gas, such as argon or neon, or hydrogen or ammonia.

The aforedescribed process has been utilized to produce bodies having a silicon nitride content of up to 98 percent. Utilizing the techniques presented heretofore, with further reiterations, it is believed that a silicon nitride content of essentially 100 percent can be approached. A mix of 60 parts silicon metal and 40 parts silicon carbide grain, when nitrided in a single firing cycle, yields a composition containing about 70 percent silicon nitride. When such nitrided composition is crushed and 70 parts are mixed with 60 parts silicon metal and again nitrided, the resulting product contains about 98 percent silicon nitride. For use in continuous casting applications of ferrous metals, however, it is believed that the silicon nitride content should range from 50 percent to 98 percent, and more desirably from 70 percent to 86 percent and optimally from 70 percent to 80 percent. The optimum composition of such articles will vary in response to the molten metal being cast and the flux system being employed to protect the surface of such molten metal. Optimization will normally occur empirically.

The invention will now be further described by way of specific non-limiting examples.

EXAMPLE 1

A high silicon nitride precursor material was prepared by reaction sintering blocks of silicon/silicon carbide in the form of 1-¼ inch thick (3.18 cm) by 9 inches (23 cm) by 4-½ inches (11.4 cm) slabs from a mix containing the following ingredients:

Silicon carbide 34–70 mesh—17 percent
Silicon carbide <70 mesh—20 percent
Silicon metal 200 mesh—60 percent
CA 25 cement—2 percent
Dextrin—1 percent The above-listed ingredients were mixed with 17.8 percent water based on the weight of the dry ingredients to obtain a flowable mix that was cast and allowed to set overnight in re-usable polystyrene foam trays. The cast slabs were subsequently dried at 60° C. for 24 hours and then at 120° C. for 24 hours before firing in a nitrogen atmosphere at 1410° C. for 12 hours. The resulting material was determined to contain approximately 20 percent alpha silicon nitride, 44 percent beta silicon nitride, and 4 percent $Si_2ON_2$, using X-ray diffraction analysis. The balance of the material was silicon carbide with a trace of silicon metal. This precursor material was then run through a jaw crusher and thereafter a roller crusher to reduce the particle size to a range from about 10 to 100 mesh having a median size of about 35 mesh. This crushed precursor material may be referred to as precursor grog. Thereafter 75 percent of crushed precursor silicon nitride/silicon carbide grain was mixed with 16 percent of 200 mesh silicon metal, 5 percent Tennessee ball clay, 3 percent LS powder and 1 percent dextrin. To this mixture was added 16-½ percent water, plus Darvan$^{tm}$ 7 at 1 cc, 1 pound of mixture, to obtain a flowable consistency. The flowable material was cast in a plaster mold, dried and fired in nitrogen for 12 hours at 1450° C. to produce a body containing about 75 percent silicon nitride having a density of 2.2 gm/cc and porosity of 19 percent (volume basis).

EXAMPLE 2

A precursor material grog was prepared according to Example 1. X-ray diffraction analysis indicated this grog to contain 70 percent silicon nitride, 30 percent silicon carbide. A dry mixture was formed containing 37 percent of this grog and 60 percent of silicon metal of 200 mesh, 2 percent CA-25 cement, 3 percent LS powder and 1 percent dextrin. 18.5 percent water and Darvan$^{tm}$ 7 as a defloculant at 1 cc per pound were added to this dry mixture to form a flowable material which was then cast into a polystyrene foam mold which had been previously coated with Vaseline$^{tm}$ petroleum jelly. The cast unfired article was thereafter dried and then fired in nitrogen at a temperature of 1425° C. for 12 hours. The resulting cast and fired article had a bulk density of 2.39 grams per cc and a porosity of 18.54 percent (volume basis).

EXAMPLE 3

31 percent of the grog described in Example 1 was admixed with 60 percent silicon metal of minus 200 mesh, 5 percent Tennessee ball clay and 3 percent LS powder. One percent dextrin was also added to the dry mix. A flowable material was made by the addition of 17 percent of water. This flowable material was cast into a plaster mold. The time observed for this material to set was from 12 to 24 hours. The cast article was thereafter dried and fired in a nitrogen atmosphere as in Example 2. The resulting fired article had a bulk density of 2.31 grams per cc and a porosity of 19.06 volume percent.

EXAMPLE 4

The procedure of Example 3 was repeated except for the following: a mixture was formed which contained 51 percent grog as described in Example 1, 40 percent silicon metal, 5 percent Tennessee ball clay, 3 percent LS powder, and 1 percent dextrin on a dry weight basis. To this was added sufficient water and Darvan$^{tm}$ 7 to result in formation of a castable liquid. The liquid material was thereupon cast into a plaster mold and allowed to set, thereafter dried and fired in a nitrogen atmosphere. The resulting completed article had a bulk density of 2.36 grams per cc and a porosity of 19.14 volume percent.

EXAMPLE 5

A 70 percent $Si_3N_4$ - 30 percent SiC continuous casting shroud was prepared from a mix containing the following ingredients:

Silicon carbide 34–70 mesh—17 percent
Silicon carbide <70 mesh—20 percent
Silicon metal 200 mesh—60 percent
Dextrin—1 percent After dry mixing the above, 18.6 percent water was added. Prior to addition of the water, Darvan$^{tm}$ 7 deflocculant at 1 cc per pound of dry mixture, plus HPB 5025 at 1-½ cc per pound of dry mixture were added to the water. After wet mixing all of the above for five minutes, the wet mixture was allowed to age at least overnight before casting. Thereafter, but shortly prior to casting, 2 percent CA 25 cement was added during remixing and the mix was cast into a Vaseline$^{tm}$ coated polystyrene foam mold set on a vibrating table. The mix was allowed to set overnight at room temperature and then dried in the polystyrene foam mold at 60° C. for one week and then 90° C. for three days. When dry, the casting together with the mold was in a nitrogen atmosphere at 1425° C. for 12 hours. The resulting continuous casting shroud had a density of 2.42 gm/cc and a porosity of 18.3 percent.

The finished shroud was cut into rings. These ring samples were then exposed to molten mold flux for four hours at 2900° F. (1593° C.). The composition of these fluxes is given in Table I below. The amount of corrosion of these ring samples is expressed in Table II below. The amount of corrosion was determined using a planimeter. Three separate tests were run. Each test employed a different mold flux respectively representative of those employed in casting carbon grade steel, electrical grade steel and stainless steel. The results expressed in Table II are an average of two samples of each material (Samples 5a and 5b) and one sample each of the prior art control products, which included alumina-graphite composite like that available from Corhart or Vesuvius, alumina graphite plus zirconia layer taken from a shroud like that available from Corhart or Vesuvius, and a fused silica shroud similar to that produced by Vesuvius and available under the name Vesilox.

TABLE I

| | Mold Flux Composition (weight percent) | | |
|---|---|---|---|
| | Low C Steel | Stainless Steel | Electrical Steel |
| $SiO_2$ | 35.4 | 36.0 | 31.5 |

TABLE I-continued

| Mold Flux Composition (weight percent) | | | |
|---|---|---|---|
| | Low C Steel | Stainless Steel | Electrical Steel |
| CaO | 30.7 | 30.0 | 35.5 |
| $Al_2O_3$ | 8.5 | 0.5 | 5.5 |
| MgO | .64 | 1.5 | 1.5 |
| $Na_2O$ | 4.77 | 12.0 | 12.0 |
| $K_2O$ | 1.73 | 0 | 1.0 |
| $F_2$ | 8.33 | 17.5 | 8.5 |
| $B_2O_3$ | 3.2 | 0 | 2.0 |
| $Fe_2O_3$ | 3.7 | 0 | 2.5 |
| C | 3.45 | 2.5 | 0 |

TABLE II

| | % CORROSION (weight loss) | | | | |
|---|---|---|---|---|---|
| | Sample 5a | Sample 5b | Alumina/ Graphite | Alumina/ Graphite W/Zirconia | Fused Silica |
| Carbon Steel Flux | 5.36 | 5.08 | 22.03 | 6.94 | 22.82 |
| Electrical Steel Flux | 2.57 | 1.92 | 12.94 | 15.52 | 27.27 |
| Stainless Steel Flux | 6.07 | 4.62 | 19.23 | 10.71 | 16.67 |

Comparision of the percent corrosion of Examples 5 and 6 which was made according to the present invention with prior art materials indicates that the high silicon nitride content materials according to the present invention exhibit substantially better corrosion resistance in contact with all three mold fluxes when compared to prior art materials.

It must also be kept in mind that materials suitable for use as continuous casting shrouds and nozzles must also have high resistance to thermal shock which is encountered during introduction of the nozzle into the molten metal or introduction of the molten metal into the nozzle. Thermal shock performance was evaluated using cast bars of $1 \times 1 \times 6$ inches ($2.54 \times 2.54 \times 15.24$ cm) of various silicon nitride bonded silicon carbide materials. Some of these test bars were subjected to mid-point bending to determine work of fracture (WOF). Relative thermal shock performance was determined by comparing the modulus of rupture (MOR) at room temperature prior to thermal cycling with that remaining after thermal cycling. Thermal cycling consisted of heating the bars from room temperature to 75° F. (24° C.) to 2200° F. (1204° C.) in 10 minutes, then removing them from the oven and exposing them to room temperature air for 10 minutes. This cycle was conducted five times. Thereafter the bars were allowed to cool in air to room temperature. The cooled bars were then tested for MOR.

TABLE III

| | Thermal Shock Performance | | | |
|---|---|---|---|---|
| | $Si_3N_4$ | WOF | Room Temp MOR (psi) | |
| Sample No. | (%) | (in-lb/in$^2$) | Before | After |
| 551 | 50 | .50 | 6330 | 4950 |
| 537 | 70 | .57 | 6350 | 4970 |
| 539 | 70 | .48 | 5230 | 4330 |
| 546 | 90 | .38 | 12550 | 9000 |
| 547 | 85 | .62 | 10840 | 10560 |

Samples 551, 537 and 539 were prepared as described for the preparation of precursor material using only a single mixing and nitriding cycle. Sample 546 corresponds to Example 3 hereinabove. Sample 547 corresponds to Example 1 hereinabove except that the percent of silicon metal added to the precursor grog and processing aids was increased to 40 percent to produce a body having 85 percent $Si_3N_4$.

The data given in Table III demonstrate that high silicon nitride content articles according to the invention are resistant to degradation upon thermal cycling.

Material and articles according the present invention are eminently suited for use in components which contact molten metal during the continuous casting of ferrous-based metals where severe chemical attack can occur, although they may be utilized for other applications.

An example of another application is heat exchanger tubes. Such tubes may be prepared by dry mixing the following ingredients:

SiC/$Si_3N_4$ grog 18 mesh—30 percent
Silicon metal 200 mesh—60 percent
Tennessee ball clay—5 percent
Methocel$^{tm}$ A4M—2 percent
LS powder—3 percent Methocel$^{tm}$ A4M is a trademark of The Dow Chemical Company for a methylcellulose product. It is employed to render the wet mix more plastic and lubricious, thus facilitating its extrusion.

Thereafter, mixing is continued while 20 percent of water is added based on weight of dry ingredients to obtain an extrudable mix. The resulting mix has a consistency of putty. The wet mix is extruded at about 40 tons pressure on a 6-inch diameter piston head (2900 psi or 20,000 kPa). The extruded tubes are dried and nitrided to yield high silicon nitride content silicon nitride/silicon carbide composition tubes.

It is to be understood that while certain representative embodiments and details have been shown for the purpose of illustrating the invention, it will be apparent to those skilled in the art that various changes and modifications may be made therein without departing from the spirit or scope of the invention.

What is claimed is:

1. A process for the preparation of an article of silicon nitride - bonded silicon carbide comprising:
   a. forming an admixture of finely divided silicon metal, and SiC grain, shaping said admixture into discrete pellets, drying said pellets, firing said dried pellets in a nitrogenous non-oxidative atmosphere at a temperature and for a period sufficient to convert substantially all of said silicon metal to $Si_3N_4$, thereby resulting in formation of $Si_3N_4$-bonded SiC precursor material pellets having a $Si_3N_4$ content of at least 50 weight percent;
   b. crushing said precursor material pellets;
   c. mixing from 30 to 75 weight percent of said crushed precursor material with from 16 to 60 weight percent finely divided silicon metal to form a green composition;
   d. shaping said green composition and drying said shaped green composition; and
   e. firing said dried green composition in a nitrogenous non-oxidative atmosphere at a temperature and for a period sufficient to convert substantially all of said silicon metal to $Si_3N_4$.

2. The process of claim 1 wherein firing of the precursor material pellets occur at about atmospheric pressure at a temperature of between 1300° C. and 1450° C.

3. The process of claim 2 wherein reaction sintering of said dried green composition occurs at about atmospheric pressure at a temperature between 1300° and 1450° C.

4. The process of claim 1 wherein the silicon metal powder has a particle size of about 200 mesh; and the green pellets have a density of 1.7 g/cc to 1.9 g/cc.

5. The process of claim 1 wherein about 2 weight percent calcium aluminate cement and about 1 weight percent dextrin and sufficient water are added in step (a) and/or step (c) to form a plastic mixture.

6. The process of claim 1 wherein the green composition further includes up to 4 weight percent of calcium aluminate cement, up to 6 weight percent of Tennessee ball clay, from 1 to 6 weight percent of fumed silica powder and from 0.5 to 2 weight percent dextrin.

7. The process of claim 1 further comprising adding sufficient water to step (c) to result in formation of a castable liquid material and casting said castable liquid material into a mold into the configuration of a nozzle.

8. The process of claim 1 further comprising:
   f. crushing the material of step (e) after firing; and
   g. repeating steps (b) through (e) but with substitution of the material of step (f) for the precursor material of step (a).

* * * * *